US008762039B2

(12) United States Patent
Koshizen

(10) Patent No.: US 8,762,039 B2
(45) Date of Patent: Jun. 24, 2014

(54) TRAFFIC CONGESTION RESOLUTION AND DRIVING ASSISTANCE SYSTEM AND METHOD

(75) Inventor: Takamasa Koshizen, Takenazawa (JP)

(73) Assignee: Honda Motor Co., Ltd., Tokyo (JP)

( * ) Notice: Subject to any disclaimer, the term of this patent is extended or adjusted under 35 U.S.C. 154(b) by 145 days.

(21) Appl. No.: 13/572,214

(22) Filed: Aug. 10, 2012

(65) Prior Publication Data

US 2013/0041574 A1 Feb. 14, 2013

(30) Foreign Application Priority Data

Aug. 11, 2011 (JP) ................................ 2011-175885

(51) Int. Cl.
*G06F 19/00* (2011.01)
*G06G 7/70* (2006.01)
*G06F 7/76* (2006.01)
*G08G 1/00* (2006.01)

(52) U.S. Cl.
USPC .......................................... 701/118; 701/117

(58) Field of Classification Search
USPC ............. 701/117, 118, 22, 37, 41, 54, 1, 533, 701/532, 454, 301, 490, 93, 423; 340/905, 340/933, 910, 934, 435; 455/450, 440; 379/88; 180/179, 178
See application file for complete search history.

(56) References Cited

U.S. PATENT DOCUMENTS

| | | | | |
|---|---|---|---|---|
| 5,801,943 | A * | 9/1998 | Nasburg | 701/117 |
| 5,822,712 | A * | 10/1998 | Olsson | 701/117 |
| 7,912,628 | B2 * | 3/2011 | Chapman et al. | 701/117 |
| 8,090,524 | B2 * | 1/2012 | Chapman et al. | 701/117 |
| 8,483,940 | B2 * | 7/2013 | Chapman et al. | 701/117 |
| 2012/0109506 | A1 * | 5/2012 | Fei et al. | 701/118 |
| 2013/0261944 | A1 * | 10/2013 | Koshizen | 701/118 |
| 2013/0268174 | A1 * | 10/2013 | Koshizen | 701/96 |
| 2013/0289862 | A1 * | 10/2013 | Chapman et al. | 701/118 |

* cited by examiner

*Primary Examiner* — Thomas Black
*Assistant Examiner* — Robert Payne
(74) *Attorney, Agent, or Firm* — Suzanne B. Gagnon

(57) ABSTRACT

A traffic congestion resolution and driving assistance system and method include obtaining the acceleration of a vehicle; calculating a power spectrum corresponding to frequencies from the acceleration; calculating a simple regression line of the power spectrum, and calculating the maximum value of the amount of change in the slope of the simple regression line. The system and method also include detecting the intervehicular distance between the vehicle and a preceding vehicle; estimating the intervehicular distance distribution from the detected intervehicular distance using a distribution estimating method; and calculating the minimum value of the covariance from the estimated intervehicular distance distribution. The system and method further include estimating the vehicle group distribution in front of the vehicle from the correlation between the minimum value of the covariance and the maximum value of the slope; performing a real-time traffic congestion prediction; and delivering real-time traffic congestion prediction information to the vehicle.

16 Claims, 9 Drawing Sheets

(A)

(B)

(A)

(B)

TRAFFIC CONGESTION RESOLUTION AND DRIVING ASSISTANCE SYSTEM AND METHOD

CROSS REFERENCE TO RELATED APPLICATIONS

The present application claims priority under 35 U.S.C. §119 to Japanese Patent Application No. 2011-175885, filed Aug. 11, 2011, entitled "Server Based Traffic Congestion Resolution and Driving Assistance Method," the contents of which are incorporated herein by reference in their entirety.

BACKGROUND

The present invention relates to a traffic congestion resolution and driving assistance system and method.

Devices are known that predict the possibility of a vehicle becoming caught in traffic congestion, for example, on the basis of the acceleration of the vehicle and the intervehicular distance from other vehicles. Devices are also known that allow the vehicle to avoid becoming caught in traffic congestion based on the results of the prediction.

However, there is a desire to reduce the processing burden required to predict the possibility of a vehicle becoming caught in traffic congestion. It is also difficult to suppress or eliminate traffic congestion simply by having a vehicle avoid traffic congestion, and it is difficult for a vehicle to intentionally avoid becoming caught in traffic congestion.

SUMMARY

The present disclosure relates to a traffic congestion resolution and driving assistance system and method to improve the computational efficiency of traffic congestion predictions, and to assist vehicles in avoiding getting caught in traffic congestion, thereby enabling the suppression or resolution of traffic congestion.

In accordance with one embodiment, a server-based traffic congestion resolution and driving assistance method includes the steps of: obtaining the acceleration of a vehicle (for example, vehicle 2 in the embodiment) that is subject to information delivery (for example, Step 12 in the embodiment); calculating a power spectrum corresponding to frequencies from frequency analysis of the obtained acceleration (for example, Step 13 in the embodiment); calculating a simple regression line of the calculated power spectrum, and calculating the maximum value of the amount of change in the slope of the simple regression line within a predetermined frequency range as the maximum value of the slope (for example, Step 14 in the embodiment). The method also includes detecting the intervehicular distance between the vehicle and a preceding vehicle (for example, Step 15 in the embodiment); estimating the intervehicular distance distribution from the detected intervehicular distance using a distribution estimating method (for example, Step 16 in the embodiment); and calculating the minimum value of the covariance from the estimated intervehicular distance distribution (for example, Step 17 in the embodiment). The method further includes estimating the vehicle group distribution in front of the vehicle from the correlation between the minimum value of the covariance and the maximum value of the slope (for example, Step 18 in the embodiment); performing a real-time traffic congestion prediction based on the estimated vehicle group distribution (for example, Step 20 in the embodiment); and delivering real-time traffic congestion prediction information to the vehicle (for example, Step 22 in the embodiment).

In accordance with another embodiment, a traffic congestion resolution and driving assistance system includes an acceleration detector for determining an acceleration of a vehicle; a frequency analyzer for calculating a power spectrum corresponding to frequencies from frequency analysis of the obtained acceleration; a simple regression calculator for calculating a simple regression line of the calculated power spectrum; and a slope maximum value calculator for calculating a maximum value of an amount of change in a slope of the simple regression line within a predetermined frequency range as a maximum value of the slope. The system also includes a preceding vehicle detector for detecting an intervehicular distance between the vehicle and a preceding vehicle; an intervehicular distance distribution estimator for estimating the intervehicular distance distribution from the detected intervehicular distance using a distribution estimating method; and a covariance minimum value calculator for calculating a minimum value of a covariance from the estimated intervehicular distance distribution. The system further includes a correlation calculator for estimating a vehicle group distribution in front of the vehicle from a correlation between the calculated covariance minimum value and the calculated slope maximum value; and a traffic congestion predictor for performing a real-time traffic congestion prediction based on the estimated vehicle group distribution and delivering real-time traffic congestion prediction information to the vehicle.

An embodiment of the present disclosure may include computer program products that include one or more instructions to cause one or more processors to perform operations. The operations may include obtaining an acceleration of a vehicle; calculating a power spectrum corresponding to frequencies from frequency analysis of the obtained acceleration; calculating a simple regression line of the calculated power spectrum; and calculating a maximum value of an amount of change in a slope of the simple regression line within a predetermined frequency range as a maximum value of the slope. The operations may also include detecting an intervehicular distance between the vehicle and a preceding vehicle; estimating an intervehicular distance distribution from the detected intervehicular distance using a distribution estimating method; and calculating a minimum value of a covariance from the estimated intervehicular distance distribution. The operations may further include estimating a vehicle group distribution in front of the vehicle from a correlation between the minimum value of the covariance and the maximum value of the slope; performing a real-time traffic congestion prediction based on the estimated vehicle group distribution; and delivering real-time traffic congestion prediction information to the vehicle.

In accordance with one embodiment, the acceleration of a plurality of vehicles is obtained, the intervehicular distance of each vehicle relative to the preceding vehicle is detected, and a comprehensive, real-time traffic congestion prediction is computed using the acceleration and intervehicular distance information. This improves computational efficiency compared to traffic prediction computations performed in each vehicle, and can provide the appropriate timing to vehicles to avoid becoming caught in traffic congestion, thereby enabling the suppression or elimination of traffic congestion. By delivering real-time traffic congestion prediction information to a plurality of vehicles, a plurality of vehicles can work together to efficiently suppress or eliminate the occurrence of traffic congestion.

In accordance with one embodiment, easily obtainable information is used, such as the acceleration of a plurality of vehicles and the intervehicular distance of each vehicle relative to the preceding vehicle. In this way, special information is not required, and traffic congestion prediction calculations can be performed easily and in real time.

In accordance with one embodiment, in addition to information related to the possibility of traffic congestion occurring and related to actual traffic congestion that has already occurred, driving guidance information is provided to vehicles to suppress or eliminate the occurrence of traffic congestion and to avoid getting caught in traffic congestion. In this way, the method is able to assist with appropriate driving.

In accordance with one embodiment, real-time traffic congestion prediction information including driving guidance information is simultaneously provided to a plurality of vehicles. In this way, a plurality of vehicles can work together to efficiently suppress or eliminate the occurrence of traffic congestion when the traffic congestion prediction is detected by the vehicles.

In accordance with one embodiment, real-time traffic congestion prediction information is delivered first to a vehicle highly impacted by traffic congestion formation in a vehicle group. In this way, the occurrence of traffic congestion can be suppressed or eliminated, and appropriate assistance can be provided to avoid traffic congestion.

DETAILED DESCRIPTION

Figure 1:
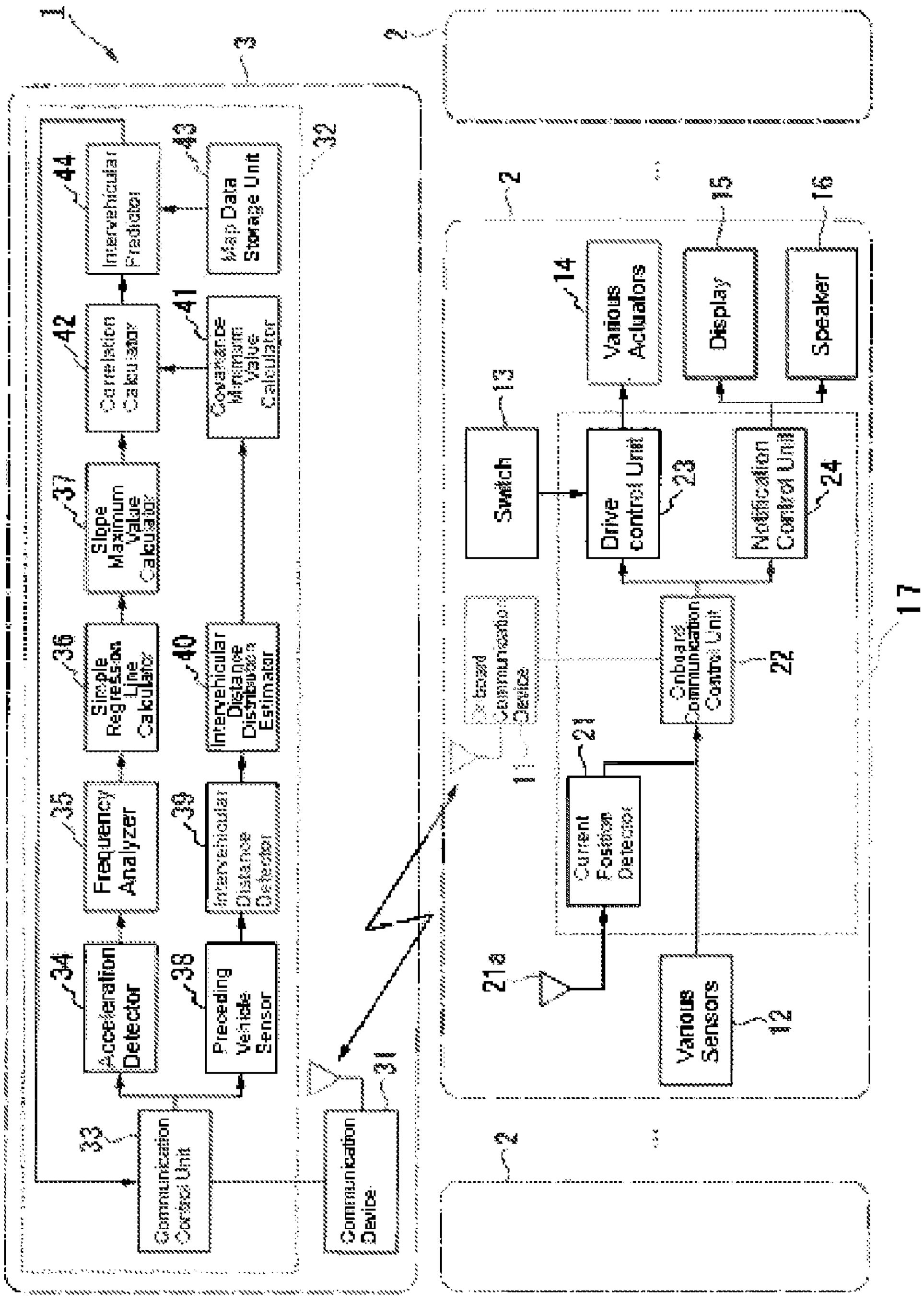
FIG. 1 is a block diagram of an information delivery system used to realize a traffic congestion resolution and driving assistance system and method according to an embodiment of the present disclosure.

The following is an explanation, with reference to the accompanying drawings, of a traffic congestion resolution and driving assistance system and method according to an embodiment of the present disclosure. With reference to FIG. 1 the information delivery system 1 used to realize the traffic congestion resolution and driving assistance system and method in this illustrative embodiment includes a plurality of vehicles 2 that are subject to information delivery and a server device 3 that is able to communicate with the plurality of vehicles 2.

A vehicle 2 includes, for example, an onboard communication device 11, various sensors 12, a switch 13, various actuators 14, a display 15, a speaker 16, and an onboard processor 17.

The onboard communication device 11 can communicate with a communication device 31 in a server device 3. The onboard communication device 11 sends and receives various types of information by establishing a direct wireless connection with the communication device 31 in the server device 3 or a connection via a predetermined communication network. The predetermined communication network can include base stations and a public communication network, such as the internet, for connecting the base stations for wireless communication to the server device 3 via a wired connection. For example, information transmitted via wireless communication from an onboard communication device 11, such as an onboard communication terminal or a cell phone belonging to an occupant of the vehicle 2, is received by a base station, and the information is transferred from the base station to the server device 3 via a wired connection. The method of communication between the vehicles 2 and the server device 3 is not limited to the method described above. Other communication methods can be used, such as communication via a communication satellite.

The various types of sensors 12 may include a speed sensor for detecting the speed of the vehicle 2 and a yaw rate sensor for detecting the yaw rate of the vehicle 2. Signals of the detected results, which may be related to the operational status of the vehicle 2, are outputted from the various sensors 12 to the onboard processor 17.

The switch 13 outputs various types of signals to the onboard processor 17. The various types of signals outputted from the switch 13 may be related to the operational status and drive control of the vehicle 2. For example, signals may be related to the operational status (e.g., the operating position) of the brake pedal or the accelerator operated by the driver. Various types of signals may also be related to the automatic drive control used to automatically control the operational status of the vehicle 2 based on input operations from the driver (e.g., instruction signals to start and stop drive control, and instruction signals for increasing or decreasing the target speed or target intervehicular distance relative to the preceding vehicle).

The various types of actuators 14 may include a throttle actuator for controlling the driving force of the vehicle 2, a brake actuator for controlling deceleration of the vehicle 2, and a steering actuator for controlling the steering of the vehicle 2. The operation of these actuators may be controlled by control signals outputted from the onboard processor 17.

The display 15 can be a display including a display screen, such as a liquid crystal display screen, a head-up display that projects a display screen onto the front windshield, or various lamps that are turned ON or OFF based on control signals outputted from the onboard processor 17. The speaker 16 outputs notification sounds or voice messages based on control signals outputted from the onboard processor 17. The display 15 and speaker 16 may also be installed in another type of onboard device, such as a navigation device.

The onboard processor 17 includes, for example, a current position detector 21, an onboard communication control unit 22, a drive control unit 23, and a notification control unit 24.

The current position detector 21 detects, for example, the current position of the vehicle 2 from positioning signals received from an antenna 21*a* or by receiving other positioning signals, such as global positioning system (GPS) signals that measure the position of a vehicle 2 using artificial satellites.

The onboard communication control unit 22 controls the transmission and reception of various types of information by the onboard communication device 11. For example, the onboard communication control unit 22 obtains speed information of the vehicle 2 (e.g., detected by the speed sensor among the various sensors 12) and current position information of the vehicle 2 (e.g., detected by the current position detector unit 21) and transmits the information from the onboard communication device 11 to the communication device 31 in the server device 3. The onboard communication control unit 22 also acquires real-time traffic congestion prediction information and driving guidance information received by the onboard communication device 11, and outputs this information to the drive control unit 23 and the notification control unit 24.

The drive control unit 23 controls the operation of the vehicle 2 by, for example, controlling the operation of the throttle actuator, the brake actuator, and the steering actuator based on the real-time traffic congestion prediction information and the driving guidance information created by the server device 3; various types of signals outputted from the switch 13; and signals of the detected results outputted from the various sensors 12. For example, the drive control unit 23 starts or stops the execution of automatic drive controls, or sets or changes the target speed or target intervehicular distance for the automatic drive controls based on signals outputted from the switch 13.

When there is a high possibility of traffic congestion ahead in the direction of travel of the vehicle 2 in the real-time traffic congestion prediction information created by the server device 3 (or traffic congestion has already occurred), the drive control unit 23 may set the necessary target speed and target intervehicular distance and change the operational status of the vehicle 2, so that the vehicle 2 avoids traffic congestion, traffic congestion is less likely to occur to vehicles traveling behind the vehicle 2, and traffic congestion is reduced or eliminated around the vehicle 2. Thus, automatic drive controls may be engaged by the drive control unit 23 to maintain the target speed and target intervehicular distance. A constant speed drive control may be engaged to match the actual speed of the vehicle to the target speed, and an intervehicular distance control may be engaged to match the actual intervehicular distance of the vehicle to another vehicle (e.g., the preceding vehicle) to the target intervehicular distance. The drive control unit 23 can also set the necessary target speed and target intervehicular distance, and change the operational status of the vehicle 2 based on driving guidance information created by the server device 3, so that the vehicle 2 avoids traffic congestion, traffic congestion is less likely to occur to vehicles traveling behind the vehicle 2, and traffic congestion is reduced or eliminated around the vehicle 2.

The notification control unit 24 performs various types of notification operations by controlling the display 15 and the speaker 16 based on real-time traffic congestion prediction information and driving guidance information created by the server device 3.

When there is a high possibility of traffic congestion ahead in the direction of travel of the vehicle 2 in the real-time traffic congestion prediction information created by the server device 3 (or traffic congestion has already occurred), the notification control unit 24 may control the display screen in the display 15, turn lamps ON and OFF, or output notification sounds or voice messages from the speaker 16 to notify the driver of information related to the traffic congestion. For example, the notification control unit 24 instructs the driver to perform the necessary driving operations (e.g., increasing the intervehicular distance relative to the preceding vehicle and refraining from acceleration) based on the real-time traffic congestion prediction information and driving guidance information created by the server device 3, so that the vehicle 2 avoids traffic congestion, traffic congestion is less likely to occur to vehicles traveling behind the vehicle 2, and traffic congestion is reduced or eliminated around the vehicle 2.

The server device 3 includes, for example, a communication device 31 and a processor 32.

The communication device 31 can communicate with an onboard communication device 11 in a vehicle 2. The communication device 31 sends and receives various types of information by establishing direct wireless connection with the onboard communication device 11 in the vehicle 2 or a connection via a predetermined communication network. The predetermined communication network can include base stations for wireless communication and a public communication network, such as the internet, for connecting the base stations to the server device 3 via a wired connection. For example, real-time traffic congestion prediction information and driving guidance information transmitted from the communication device 31 via a wired connection is received by a base station, and the information is transferred from the base station to a vehicle 2 via wireless communication.

The processor 32 includes, for example, a communication control unit 33, an acceleration detector 34, a frequency analyzer 35, a simple regression line calculator 36, a slope maximum value calculator 37, a preceding vehicle sensor 38, an intervehicular distance detector 39, an intervehicular distance distribution estimator 40, a covariance minimum value calculator 41, a correlation calculator 42, a map data storage unit 43, and a traffic congestion predictor 44.

The communication control unit 33 controls the transmission and reception of various types of information by the communication device 31. For example, the communication control unit 33 obtains real-time traffic congestion prediction information and driving guidance information created by the traffic congestion predictor 44, and transmits this information from the communication device 31 to the onboard communication device 11 in the vehicle 2. The communication control unit 33 also acquires speed information and current position information of the vehicle 2 received by the communication device 31 from the onboard communication device 11 in the vehicle 2, and outputs the information to the acceleration detector 34 and the preceding vehicle sensor 38.

The acceleration detector 34 detects the acceleration of the vehicle 2, for example, from the change over time in the speed or the change over time in the current position, based on speed information or current position information obtained from the communication control unit 33.

The frequency analyzer 35 performs frequency analysis on the acceleration of the vehicle 2 detected by the acceleration detector 34, and calculates a power spectrum corresponding to the frequencies. For example, by performing a frequency analysis on the acceleration of the vehicle 2 for two different appropriate operational states, acceleration spectrums 51, 53 corresponding to the frequencies are calculated as power spectrums as shown in FIG. 2A and FIG. 2B.

The simple regression line calculator 36 calculates simple linear regression lines for the power spectrums calculated using the frequency analyzer 35. For example, simple linear regression lines 52, 54 are calculated for the acceleration spectrums 51, 53 shown in FIG. 2A and FIG. 2B.

The slope maximum value calculator 37 calculates the maximum value of the amount of change in the slope of the simple regression line within a predetermined frequency range as the maximum value of the slope for a simple regression line calculated by the simple regression line calculator 36.

Figure 2:
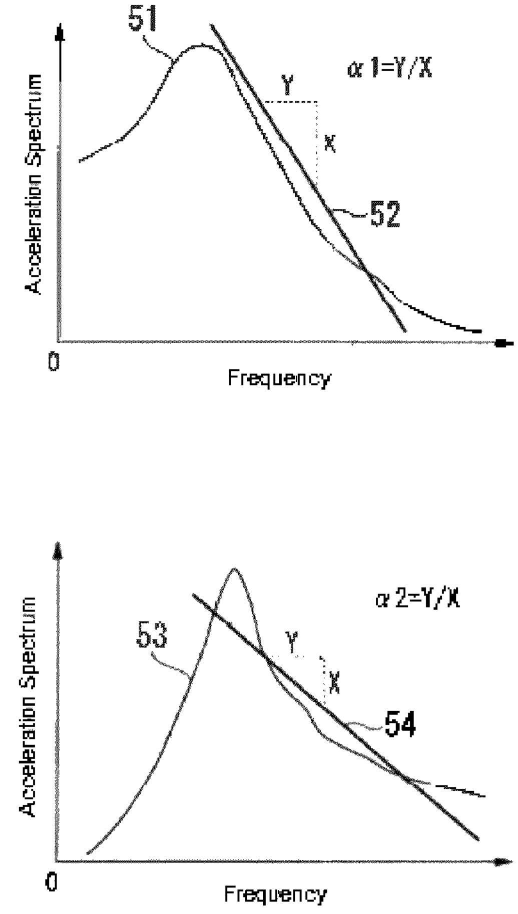
FIGS. 2A and 2B are diagrams showing examples of an acceleration spectrum in an embodiment of the present disclosure.

For example, the slope maximum value calculator 37 calculates slopes α1, α2 (=Y/X) based on change X in the spectrum value within a predetermined frequency range Y for the simple linear regression lines 52, 54 shown in FIG. 2A and FIG. 2B. The predetermined frequency range Y may have a frequency range such as 0 to 0.5 Hz corresponding to a time range of several seconds or several minutes or may be any other given frequency range.

The preceding vehicle detector 38 detects the preceding vehicle in front of each vehicle 2 in the direction of travel based on current position information from a plurality of vehicles 2 obtained from the communication control unit 33. The intervehicular distance detector 39 detects the intervehicular distance relative to the preceding vehicle of each vehicle 2 detected by the preceding vehicle detector 38.

The intervehicular distance distribution estimator 40 estimates the intervehicular distance distribution based on the intervehicular distance relative to the preceding vehicle for each vehicle 2 detected by the intervehicular distance detector 39, and the detected number of vehicles 2 (e.g., the number of vehicles 2 from which current position information has been obtained by the communication control unit 33).

Figure 3:
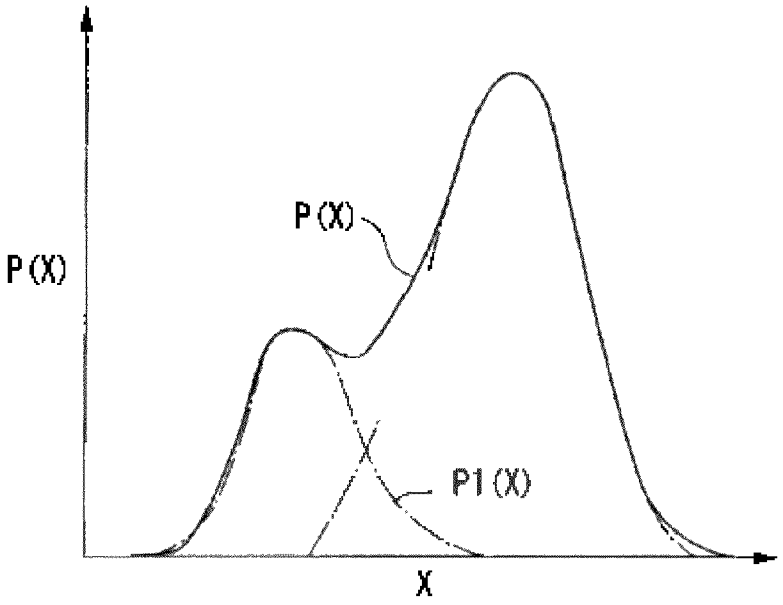
FIG. 3 is a diagram showing an example of a probability density distribution in an embodiment of the present disclosure.

For example, when vehicle groups (that is, groupings of vehicles 2 whose intervehicular distance is relatively close) have been detected in front of a certain vehicle 2 from the intervehicular distance information and number of vehicles information, the intervehicular distance distribution estimator 40 applies a Gaussian distribution or probability density distribution to each vehicle group using a distribution estimating method, such as the Variational Bayes method. For instance, when there are two vehicle groups, the two vehicle groups can be viewed as a distribution that is a linear combination of two Gaussian distributions. As shown in FIG. 3, a probability function P(X) representing the overall distribution is obtained as a sum or superimposition of probability functions P1(X), P2(X) representing the two Gaussian distributions.

The superimposition of a plurality of Gaussian distributions as shown in FIG. 3 can be described using Equation (1) below, where a Gaussian distribution (probability function) is represented by N $(x|\mu, \Sigma)$.

Equation (1)

$$p(x) = \sum_{k=1}^{K} \pi_k N(x \mid \mu_k, \Sigma_k) \tag{1}$$

In Equation (1), the expected value or average value $\mu_k$ represents the position with the highest density with respect to any given natural number k. The covariance value or matrix $\Sigma_k$ represents the distortion of distribution, or how the density decreases when moving away from the expected value $\mu_k$ in any direction. The mixing coefficient or mixing ratio of the Gaussian distributions πk ($0 \le \mu_k \le 1$) represents the percentage (that is, probability) of how much each Gaussian distribution contributes.

The covariance minimum value calculator 41, for example, performs a calculation using a method, such as the Variational Bayes method, to determine the parameters or covariance in which the maximum likelihood function is obtained from the probability function P(X). The covariance minimum value calculator 41, for example, calculates the covariance value $\Sigma_k$ for each Gaussian distribution with respect to a probability function P(X) obtained by superimposing a plurality of Gaussian distributions as shown in FIG. 3. Then, the minimum value of the plurality of covariance values $\Sigma_k$ obtained with respect to each Gaussian distribution is calculated.

Figure 4:
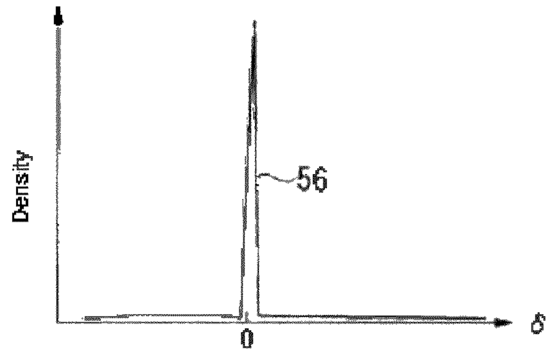
FIGS. 4A and 4B are diagrams showing examples of a covariance value distribution in an embodiment of the present disclosure.
Figure 4:
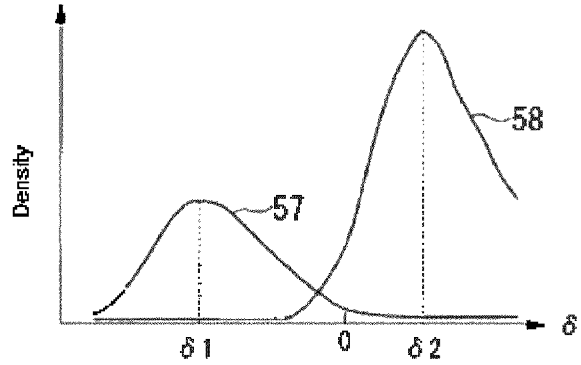

For example, the graph 56 of the distribution of covariance values $\Sigma_k$ shown in FIG. 4A is a sharp graph at variable δ=0 according to the covariance value $\Sigma_k$. This suggests no change in the vehicle groups, that is, the vehicles are traveling in a state in which the intervehicular distance is fairly constant. The distribution of the covariance values $\Sigma_k$ shown in FIG. 4B is composed of two graphs: a graph 57 having a peak at value δ1 in the negative range of variable δ according to the covariance value $\Sigma_k$, and a graph 58 having a peak at value δ2 in the positive range of the same variable. Both graphs 57, 58 have a predetermined fluctuation range with respect to variable δ according to the covariance value $\Sigma_k$, and this suggests a change in the vehicle groups. In other words, there is a plurality of groupings of vehicles 2 with different intervehicular distances. For example, in FIG. 4A, the minimum value of the covariance value $\Sigma_k$ (the covariance minimum value) is nearly zero, and in FIG. 4B, the minimum value of the covariance value $\Sigma_k$ is smaller for value δ1 among the two values δ1 and δ2.

Figure 5:
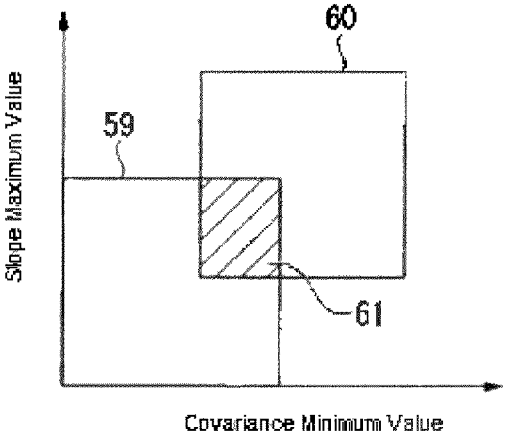
FIG. 5 is a diagram showing an example of correlation maps of covariance minimum values and slope maximum values in an embodiment of the present disclosure.

The correlation calculator 42 creates a correlation map of the slope maximum value calculated by the slope maximum value calculator 37 and the covariance minimum value calculated by the covariance minimum value calculator 41. For example, an image or conceptual diagram of a correlation map for slope maximum values and covariance minimum values is shown in FIG. 5. In this diagram, the horizontal (X) axis denotes the covariance minimum value X, the vertical (Y) axis denotes the slope maximum value Y, and the correlation of variables (X, Y) is mapped.

For example, there are two regions 59, 60 in the correlation map shown in FIG. 5, and a critical region 61 is formed by the two overlapping regions 59, 60. In region 59, the covariance minimum value is relatively small. This corresponds to a state in which there is very little change in the vehicle groups. In other words, it corresponds to a state in which the intervehicular distance is relatively constant. In contrast, in region 60, the covariance minimum value is relatively large. This corresponds to a state in which there is significant change in the vehicle groups. In other words, it corresponds to a state in which there is a plurality of groupings of vehicles with different intervehicular distances. The critical region 61 is a region in which there is a transition from a state in which there is very little change in the vehicle groups to a state in which there is significant change in the vehicle groups. By quantitatively finding a state of vehicle groups corresponding to the critical region 61, it is possible to predict traffic congestion.

Figure 6:
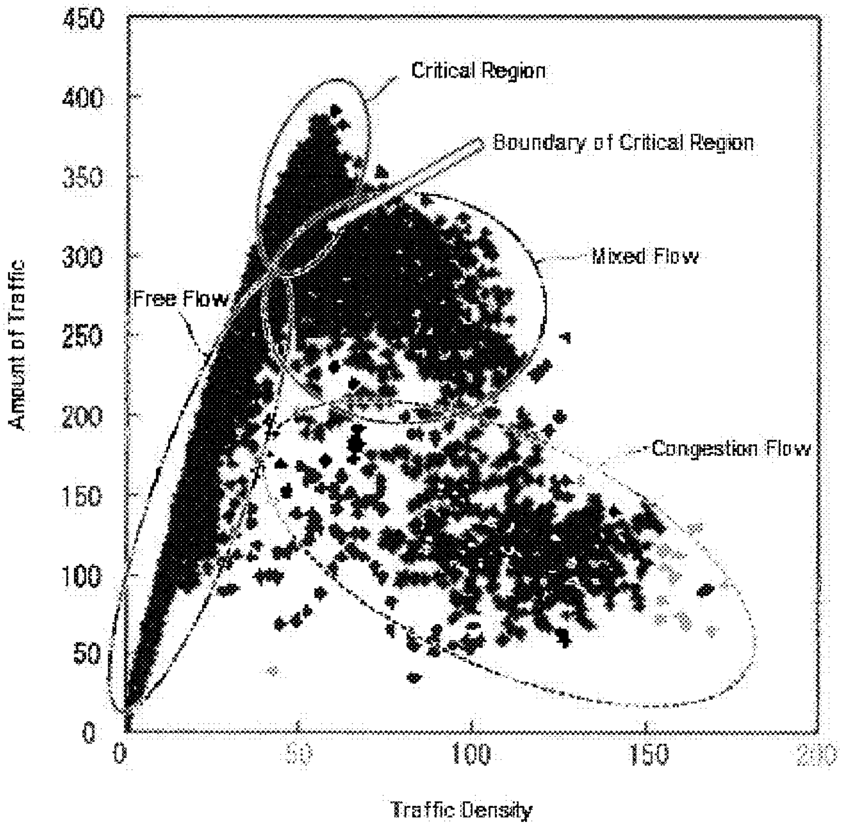
FIG. 6 is a diagram showing an example of the relationship between the density of traffic congestion and the amount of traffic congestion in an embodiment of the present disclosure.

FIG. 6 is a graph showing the relationship between traffic density and the amount of traffic. The horizontal (X) axis of the graph is the traffic density, which means the number of other vehicles within a predetermined distance from a certain vehicle 2. The reciprocal of traffic density corresponds to intervehicular distance. The vertical (Y) axis is the amount of traffic, which means the number of vehicles passing a predetermined position. The relationship between traffic density and the amount of traffic in FIG. 6 can be viewed as an expression of traffic flow, meaning the flow of vehicles 2.

The traffic flow shown in FIG. 6 can be divided into four states or regions. The first state is a state of free flow in which the possibility of traffic congestion occurring is small. Here, acceleration and intervehicular distances above a certain value can be maintained. The second state is a state of mixed flow in which vehicles 2 in a braking state and accelerating state are mixed together. The mixed flow state is the state prior to a transition to congested flow. The degree of operational freedom for the drivers is reduced, and the traffic density increases (reduced intervehicular distances). In this state, there is a high probability of a transition to congested flow. The third state is a state of congested flow indicating traffic congestion. The fourth state is a critical region in which there a state of transition from the free flow state to the congested flow state. The critical region is a state in which there is higher traffic density and a greater amount of traffic than the free flow state. In this state, there is a transition to mixed flow when there is a decrease in the amount of traffic and an increase in traffic density (reduced intervehicular distances). The critical region may also be referred to as quasi-stable flow or metastable flow.

The region 59 in FIG. 5 includes the free flow and critical region shown in FIG. 6, and region 60 in FIG. 5 includes the mixed flow and congested flow states shown in FIG. 6. Therefore, the critical region 61 in FIG. 5 is a boundary state including both the critical region and the mixed flow state shown in FIG. 6. The boundary of the critical region shown in FIG. 6 is the boundary state. By quantitatively grasping the critical region including the boundary of the critical region, the transition to the mixed flow state can be suppressed, and the occurrence of traffic congestion can be prevented.

The following is an explanation of the quantification of the critical region with reference to FIG. 7A and FIG. 7B which show correlation maps of logarithms of covariance minimum values in the intervehicular distance distribution and logarithms of slope maximum values in the acceleration spectrum. FIG. 7A is a simplification of the map of traffic flow shown in FIG. 6, and FIG. 7B is a correlation map of logarithms of the covariance minimum values and logarithms of the slope maximum values. The logarithms of the covariance minimum values and logarithms of the slope maximum values shown in FIG. 7B are calculated as logarithms of the slope maximum values calculated by the slope maximum value calculator 37 and the covariance minimum values calculated by the covariance minimum value calculator 41. These depict the parameterization of the phase transition state in the critical region.

In FIG. 7B, a region 62 includes the critical region shown in FIG. 7A, and a region 63 includes the mixed flow state shown in FIG. 7A. A critical line 64 indicates the critical point at which there has been a transition to the mixed flow state and the possibility of traffic congestion occurring is high. A critical region or boundary state 65 between regions 62 and 63 and immediately before the critical line 61 corresponds to the boundary of the critical region shown in FIG. 7A. The correlation map shown in FIG. 7B may be stored in memory inside the processor 32.

The traffic congestion predictor 44 determines whether or not a boundary state or critical region exists in the correlation map created by the correlation calculator 42, and creates real-time traffic congestion prediction information based on the determined results. When a boundary state or critical regions exists in the correlation map, map data that may be stored in the map data storage unit 43 is referenced, and driving guidance information is created to prevent a transition to traffic congestion.

The real-time traffic congestion prediction information is information related to whether or not there is a possibility of traffic congestion occurring or whether or not traffic congestion has already occurred. For example, the possibility of traffic congestion occurring (prediction interval for traffic congestion) is higher than a predetermined threshold value when there is a boundary state or critical region in the correlation map, and the possibility of traffic congestion occurring (prediction interval for traffic congestion) is lower than a predetermined threshold value when there is no boundary state or critical region in the correlation map.

The prediction interval for traffic congestion is a parameter corresponding to the slope maximum value calculated, for example, by the slope maximum value calculator 37. This parameter is larger when the possibility of traffic congestion occurring ahead of the vehicle 2 in the direction of travel is high, and the parameter is smaller when the possibility is low. The predetermined threshold value for determining the magnitude of the prediction interval for traffic congestion can be any given value. However, −45 degrees, which is a commonly known (1/f) fluctuation characteristic, can be used as the predetermined threshold value.

A situation in which the slope $\alpha$ is small relative to a simple regression line calculated, for example, by the simple regression line calculator 36 corresponds to a situation in which the acceleration pattern received from the preceding vehicle is small. The reaction delay relative to the preceding vehicle is small, the intervehicular distance is long, and a vehicle group is unlikely to form. In other words, this corresponds to a situation in which the possibility of traffic congestion is low. In this situation, the prediction interval for traffic congestion is a small value. A situation in which the slope $\alpha$ is large corresponds to a situation in which the acceleration pattern received from the preceding vehicle is large. The reaction delay relative to the preceding vehicle is great, and the vehicle group is likely to become dense. In other words, this corresponds to a situation in which the possibility of traffic congestion is high. In this situation, the prediction interval for traffic congestion is a large value. Here, acceleration pattern means the repeated acceleration and deceleration operations of the vehicles 2 has caused the acceleration and deceleration operations to be propagated as a type of back and forth motion or collision wave to the vehicles 2 in the rear.

Therefore, the traffic congestion predictor 44 calculates the prediction interval for traffic congestion based on the size of the slope $\alpha$ of the simple regression line calculated by the simple regression line calculator 36 and, more specifically, from the slope maximum value calculated by the slope maximum value calculator 37. For example, the traffic congestion predictor 44 determines in advance a function (for example, $y=ax+b$) indicating the relationship between the slope maximum value (x) and the prediction interval for traffic congestion (y), and then calculates the prediction interval for traffic congestion (y) relative to the slope maximum value (x) calculated by the slope maximum value calculator 37. The traffic congestion predictor 44 can create functions for the values of the predictive degrees of traffic congestion corresponding to the slope maximum values in advance, store the functions in the memory as a table, and determine the prediction interval for traffic congestion relative to a calculated slope maximum value by referencing the table.

When real-time traffic congestion prediction information, which indicates that the possibility of traffic congestion occurring (the prediction interval for traffic congestion) is higher than a predetermined threshold value, is transmitted from the server device 3 to a vehicle 2, various notification operations are performed to indicate that the possibility of traffic congestion occurring is high on the display 15 and speaker 16 of the vehicle 2. For example, the color of the display can be switched between two color signals (e.g., blue and red, etc.), a single-color lamp can be turned ON or OFF, or a notification message can be outputted to indicate that traffic congestion will occur. A notification sound or notification voice message can also be outputted using the speaker 16 to indicate that traffic congestion will occur.

Figure 7:
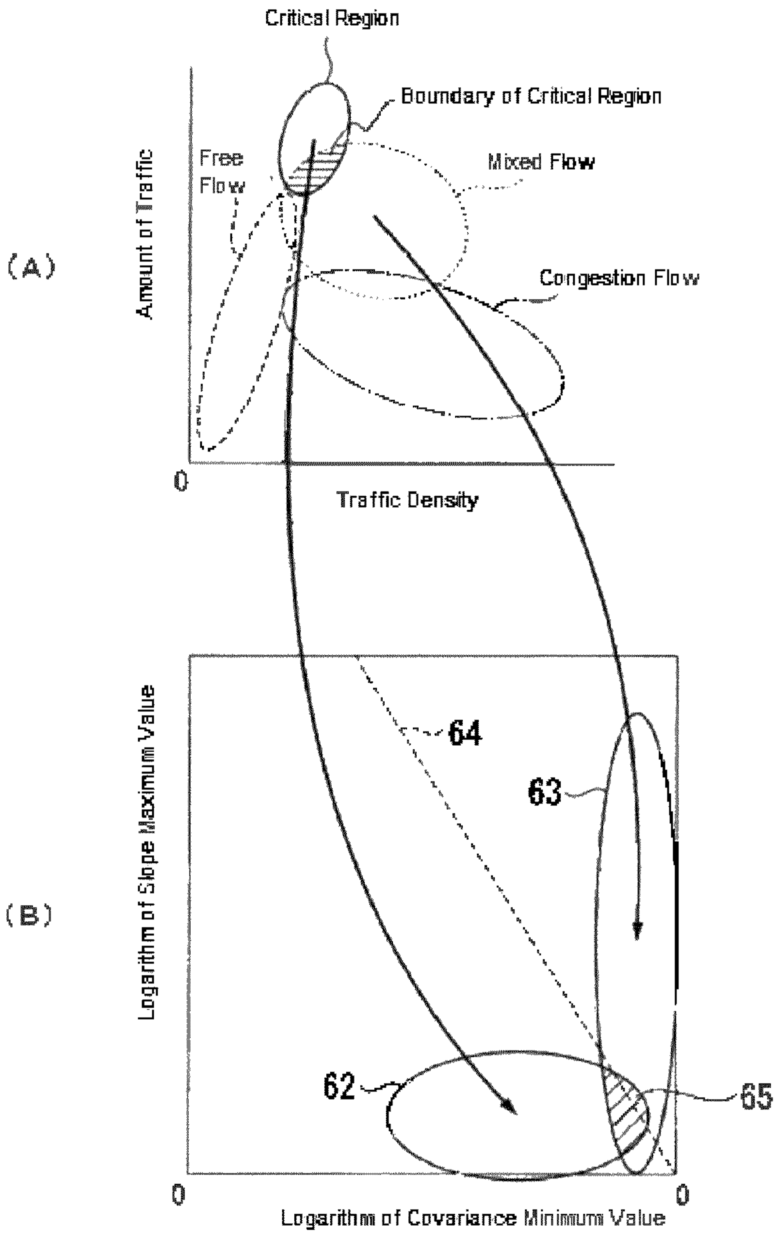
FIGS. 7A and 7B are diagrams showing an example of the relationship between the density of traffic congestion and the amount of traffic congestion and an example of correlation maps of logarithms of covariance minimum values for the intervehicular distance distribution and logarithms of slope maximum values for the acceleration spectrum in an embodiment of the present disclosure.

In order to proactively prevent a transition to the mixed flow shown in FIG. 7, driving guidance information is used to control the operation of a vehicle 2. This information is provided to the driver from the display 15 and the speaker 16 in the vehicle 2. Examples of the driving guidance information include information on the target speed and target intervehicular distance needed for the automatic drive control of the vehicle 2 to avoid or eliminate traffic congestion; information on predetermined driving operations, such as increasing the intervehicular distance relative to the preceding vehicle or to refrain from accelerating; and information on route searches and route guidance for the vehicle 2. When the driving guidance information is transmitted from the server device 3 to a vehicle 2, the driver is informed of the content of the driving guidance information from the display 15 or the speaker 16, or the information is used to perform the automatic drive control to implement the content of the driving guidance information.

When real-time traffic congestion prediction information and driving guidance information is transmitted to vehicles 2, the traffic congestion predictor 44 may provide the information only to certain vehicles 2 in a group of vehicles 2 or vehicle group within a certain range believed to impact each other in the formation of traffic congestion. For example, the traffic congestion predictor 44 targets only the vehicle groups within a certain distance range believed to form traffic congestion (e.g., vehicles in a range of several hundred meters affected by the use of traffic elimination operation). Also, only a certain percentage of vehicles 2 (e.g., 10% to 30%) within the predetermined distance range are targeted. Among vehicles 2 whose prediction interval for traffic congestion is greater than a predetermined threshold value, those with the highest predictive degree for traffic congestion may be preferentially targeted for the delivery of information.

Figure 8:
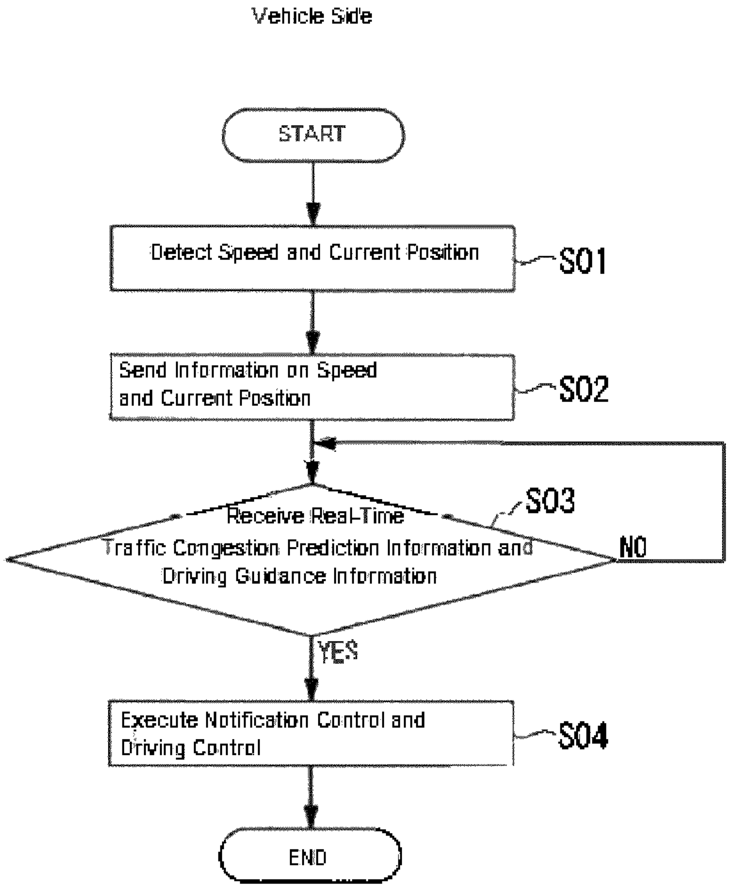
FIG. 8 is a flowchart showing the operations performed by a vehicle in an embodiment of the present disclosure.
Figure 9:
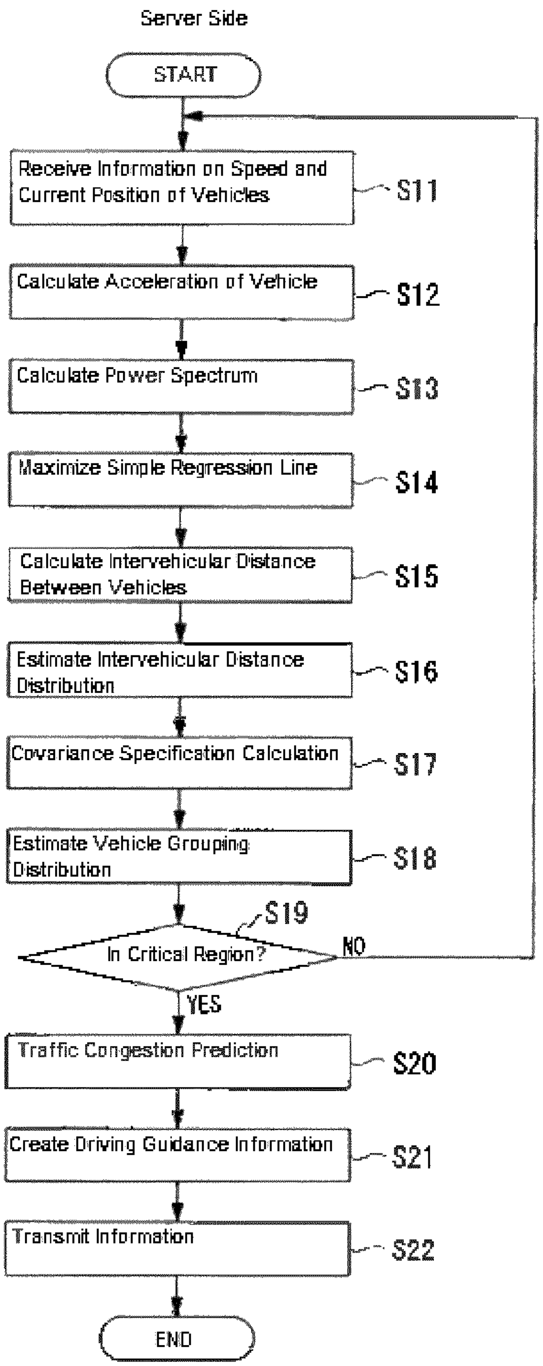
FIG. 9 is a flowchart showing the operations performed by a server device in an embodiment of the present disclosure.

Operations of the information delivery system 1 according to the present embodiment, which may have the above configuration, will now be described in detail with reference to flowcharts in FIG. 8 and FIG. 9.

First, the operations performed by the vehicle 2 will be explained. For example, in Step S01 shown in FIG. 8, the speed of the vehicle 2 is detected by the speed sensor among the various sensors 12, and the current position of the vehicle 2 is detected by the current position detector 21. Next, in Step S02, the speed and current position information for the vehicle 2 is transmitted to the server device 3.

Next, in Step S03, it is determined whether or not real-time traffic congestion prediction information and driving guidance information has been received from the server device 3. When the result of the determination is NO, the process repeats the determination operation in Step S03. When the result of the determination is YES, the process advances to Step S04. Then, in Step S04, notification controls and drive controls are executed based on the real-time traffic congestion prediction information and driving guidance information, and the process advances to END.

The following is an explanation of the operations performed by the server device 3. First, for example, in Step S11 shown in FIG. 9, speed and current position information from a plurality of vehicles 2 is received. Next, in Step S12, the acceleration of each vehicle 2 is detected based on the change over time in the speed or the change over time in the current position of each vehicle 2.

Next, in Step S13, a frequency analysis is performed on the acceleration of the vehicles 2, and a power spectrum corresponding to the frequencies is calculated.

Next, in Step S14, a simple regression line is calculated for the power spectrum, and the maximum value for the amount of change in the slope of the simple regression line within a predetermined frequency range is calculated as the slope maximum value.

Next, in Step S15, the preceding vehicle in front of each vehicle 2 in the direction of travel is detected, and the intervehicular distance relative to the preceding vehicle is calculated for each vehicle 2. Next, in Step S16, the intervehicular distance distribution is estimated based on the intervehicular distance relative to the preceding vehicle for each vehicle 2 and the number of detected vehicles 2. Next, in Step S17, the minimum value for the covariance is calculated from the vehicle distance distribution.

Next, in Step S18, the vehicle group distribution ahead of a vehicle 2 in the direction of travel is estimated from the correlation of the minimum value of the covariance and the slope maximum value. Next, in Step S19, it is determined whether or not there is a boundary state or critical region in the correlation map for the covariance minimum value and the slope maximum value. When the result of the determination is NO, the process advances to Step S11 described above. When the result of the determination is YES, the process advances to Step S20.

Next, in Step S20, real-time traffic congestion prediction information is created indicating the possibility of traffic congestion occurring (prediction interval for traffic congestion) is higher than a predetermined threshold value. Next, in Step S21, driving guidance information is created to encourage the vehicle 2 to avoid traffic congestion or eliminate traffic congestion. Next, in Step S22, the real-time traffic congestion prediction information and driving guidance information are transmitted to the vehicle 2, and the process advances to END.

Because, as explained above, the information delivery system 1 in this embodiment obtains the acceleration of a plurality of vehicles 2, detects the intervehicular distance of each vehicle 2 relative to the preceding vehicle, and computes comprehensive, real-time traffic congestion prediction information using the acceleration and intervehicular distance information, computational efficiency can be improved compared to traffic prediction computations performed in each vehicle 2. The appropriate timing can also be provided to vehicles 2 to avoid becoming caught in traffic congestion, thereby enabling the suppression or elimination of traffic congestion. Further, by simultaneously providing real-time traffic congestion prediction information including driving guidance information to a plurality of vehicles 2, a plurality of vehicles 2 can work together to efficiently suppress or eliminate the occurrence of traffic congestion when the traffic congestion prediction is received by the vehicles 2.

Also, by using easily obtainable information such as the acceleration of a plurality of vehicles 2 and the intervehicular distance of each vehicle 2 relative to the preceding vehicle, special information is not required, and traffic congestion prediction calculations can be performed easily and in real time.

In addition to information on the possibility of traffic congestion occurring and on actual traffic congestion that has already occurred, driving guidance information is provided to vehicles 2 to assist in suppressing or eliminating the occurrence of traffic congestion and in avoiding getting caught in traffic congestion.

Also, by preferentially delivering real-time traffic congestion prediction information to vehicles highly impacted by the formation of traffic congestion in a vehicle group 2, the occurrence of traffic congestion can be suppressed or eliminated, and appropriate assistance can be provided to avoid traffic congestion.

In the embodiment described above, the server device 3 can also obtain information on the intervehicular distance relative to the preceding vehicle transmitted from the vehicle 2 when the intervehicular distance relative to the preceding vehicle is detected using a radar device or other distance detection device installed in the vehicle 2.

Each vehicle 2 can include functions similar to those of the processor 32 of the server device 3 in the embodiment described above. In this information delivery system, each vehicle 2 transmits traffic congestion prediction information obtained from this function to the server device 3. Then, the server device 3 creates driving guidance information based on the traffic congestion prediction information transmitted by each vehicle 2 and sends the driving guidance information to each vehicle 2. In this case, when certain vehicles 2 in a vehicle group consisting of vehicles 2 within a predetermined distance range have a high prediction interval for traffic congestion and other vehicles 2 in the vehicle group have a low prediction interval for traffic congestion, the server device 3 manages information for a plurality of vehicles in the vehicle group, including the vehicles 2 having a low prediction interval for traffic congestion, so that traffic control is performed to completely avoid traffic congestion. In other words, traffic congestion is effectively eliminated in a vehicle group by increasing the possibility of change, so that vehicles 2 within a certain condition range have a prediction interval for traffic congestion similar to nearby vehicles having a high prediction interval for traffic congestion, and by including these vehicles 2 in the executed drive control.

The features described can be implemented in digital electronic circuitry, or in computer hardware, firmware, software, or in combinations of them. The system can be implemented in a computer program product tangibly embodied in an information carrier (e.g., in a machine-readable storage device or otherwise in a computer-readable media), for execution by a programmable processor; and methods can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may be a processor for executing instructions and one or more memories for storing instructions and data. A computer may also include, or be operatively coupled to communicate with, one or more mass storage devices for storing data files; such devices include magnetic disks, such as internal hard disks and removable disks (e.g., magneto-optical disks, optical disks, solid-state disks, and the like). Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such as internal hard disks and removable disks; magneto-optical disks; and CD-ROM (compact disc read only memory) and DVD-ROM (digital versatile disc read only memory) disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or other type of monitor for displaying information to the user and a keyboard and a pointing device such as a mouse or a trackball by which the user can provide input to the computer. Other input devices may include a joystick-type device, a touch-screen display, hard buttons (e.g., physical buttons tied to one or more operations), and/or soft buttons (e.g., physical buttons that depend on a context in which a program is running).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet. Communication networks may use various technologies for wired and wireless communications, such as CDMA (Code Division Multiple Access), LTE (Long Term Evolution), IEEE (Institute of Electrical and Electronics Engineers) 802.11 standards, and the like.

The present disclosure uses examples to disclose the invention, including the best mode, and also to enable any person skilled in the art to make and use the invention. While examples have been described with specific flow charts or processes, variations may use different systems and/or processes. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A server-based traffic congestion resolution and driving assistance method comprising the steps of:

obtaining an acceleration of vehicles subject to information delivery; calculating a power spectrum corresponding to frequencies from frequency analysis of the obtained acceleration; calculating a simple regression line of the calculated power spectrum, and calculating a maximum value of an amount of change in a slope of the simple regression line within a predetermined frequency range as a maximum value of the slope;

detecting an intervehicular distance between each vehicle and a preceding vehicle; estimating an intervehicular distance distribution from the detected intervehicular distance using a distribution estimating method; calculating a minimum value of a covariance from the estimated intervehicular distance distribution;

estimating a vehicle group distribution ahead from a correlation between the minimum value of the covariance and the maximum value of the slope; performing a real-time traffic congestion prediction based on the estimated vehicle group distribution; and delivering real-time traffic congestion prediction information first to vehicles highly impacted by traffic congestion formation in a vehicle group comprising a plurality of vehicles.

2. A server-based traffic congestion resolution and driving assistance method according to claim 1, wherein, in the step for obtaining the acceleration, the acceleration is calculated and obtained from a change over time in current position information transmitted by the vehicles or a change over time in speed information transmitted by the vehicles.

3. A server-based traffic congestion resolution and driving assistance method according to claim 1, wherein, in the step for delivering real-time traffic congestion prediction information, driving guidance information is created based on the real-time traffic congestion prediction information, and the driving guidance information including the real-time traffic congestion prediction information is delivered to the vehicles.

4. A traffic congestion resolution and driving assistance system, comprising:

an acceleration detector for determining accelerations of a plurality of vehicles in a plurality of vehicle groups;

a frequency analyzer for calculating a power spectrum corresponding to frequencies from frequency analysis of the determined acceleration;

a simple regression calculator for calculating a simple regression line of the calculated power spectrum;

a slope maximum value calculator for calculating a maximum value of an amount of change in a slope of the simple regression line within a predetermined frequency range as a maximum value of the slope;

a preceding vehicle detector for detecting an intervehicular distance between each vehicle and a corresponding preceding vehicle;

an intervehicular distance distribution estimator for estimating the intervehicular distance distribution from the detected intervehicular distance using a distribution estimating method;

a covariance minimum value calculator for calculating a minimum value of a covariance from the estimated intervehicular distance distribution;

a correlation calculator for estimating a vehicle group distribution ahead from a correlation between the calculated covariance minimum value and the calculated slope maximum value; and a traffic congestion predictor for performing a real-time traffic congestion prediction based on the estimated vehicle group distribution, creating driving guidance information based on the real-time traffic congestion prediction, and delivering real-time traffic congestion prediction information and the driving guidance information to vehicles in at least one vehicle group.

5. A traffic congestion resolution system according to claim 4, wherein the real-time traffic congestion prediction information and the driving guidance information are simultaneously provided to the vehicles.

6. A traffic congestion resolution system according to claim 4, wherein the real-time prediction information and the driving guidance information are provided to targeted vehicles in at least one vehicle group within a predetermined range predicted to impact each other in forming traffic congestion.

7. A traffic congestion resolution system according to claim 6, wherein the targeted vehicles include at least one vehicle group within a predetermined distance range predicted to form traffic congestion and a predetermined percentage of vehicles in the at least one vehicle group within the predetermined distance range.

8. A traffic congestion resolution system according to claim 4, wherein the correlation is a correlation map of the calculated covariance minimum value and the calculated slope maximum value.

9. A traffic congestion resolution system according to claim 8, wherein the traffic congestion predictor determines whether or not a boundary state or critical region exists in the correlation map; and when a boundary state or critical region exists in the correlation map, the driving guidance information is created based on the real-time traffic congestion prediction information and delivered to the vehicles.

10. A traffic congestion resolution system according to claim 8, wherein when a possibility of traffic congestion occurring is smaller than a first predetermined threshold value, there is no boundary state or critical region in the correlation map; and when the possibility of traffic congestion occurring is higher than a second predetermined threshold value, there is a boundary state or critical region in the correlation map.

11. A traffic congestion resolution system according to claim 10, wherein the possibility of traffic congestion is determined by a prediction interval for traffic congestion, the prediction interval for traffic congestion being a parameter corresponding to the slope maximum value; and wherein the parameter is larger when the possibility of traffic congestion occurring ahead in a direction of travel is high, and the parameter is smaller when the possibility of traffic congestion occurring ahead in the direction of travel is low.

12. A traffic congestion resolution system according to claim 11, wherein the traffic congestion predictor determines functions for values of predictive degrees of traffic congestion corresponding to slope maximum values, stores the functions in memory, and determines the prediction interval for traffic congestion relative to the calculated slope maximum value by referencing the stored functions.

13. A computer program product embodied on a computer-readable media, the media comprising computer-readable instructions, the instructions operable to cause one or more processors to perform operations comprising:

obtaining an acceleration of vehicles; calculating a power spectrum corresponding to frequencies from frequency analysis of the obtained acceleration; calculating a simple regression line of the calculated power spectrum, and calculating a maximum value of an amount of change in a slope of the simple regression line within a predetermined frequency range as a maximum value of the slope;

detecting an intervehicular distance between each vehicle and a preceding vehicle; estimating an intervehicular distance distribution from the detected intervehicular distance using a distribution estimating method; calculating a minimum value of a covariance from the estimated intervehicular distance distribution;

estimating a vehicle group distribution ahead from a correlation between the minimum value of the covariance and the maximum value of the slope; performing a real-time traffic congestion prediction based on the estimated vehicle group distribution; and delivering real-time traffic congestion prediction information to the vehicles and delivering driving guidance information, based on the real-time traffic congestion prediction information, to the vehicles.

14. A computer program product according to claim 13, wherein the real-time traffic congestion prediction information indicates that a possibility of traffic congestion occurring is higher than a predetermined threshold value; and when the real-time congestion prediction information is delivered to a vehicle, at least one notification operation is performed by a vehicle processor to indicate the possibility of traffic congestion occurring.

15. A computer program product according to claim 14, wherein the at least one notification operation includes varying a color or gauge on a display, turning an indicator on or off, outputting a visual message, and outputting a sound or voice message.

16. A computer program product according to claim 13, wherein the driving guidance information includes at least one of information on target speed or target intervehicular distance for automatic drive control of a vehicle, and information on predetermined driving operations to refrain from accelerating or to increase the intervehicular distance relative to the preceding vehicle.

* * * * *